3,122,204
A METHOD FOR ACIDIZING WELLS AND COMPOSITION THEREFOR
David T. Oakes, Dickinson, Tex., assignor to Monsanto Chemical Company, St. Louis, Mo., a corporation of Delaware
No Drawing. Filed Apr. 19, 1960, Ser. No. 23,161
15 Claims. (Cl. 166—42)

The present invention relates to the acid treatment of wells for the purpose of increasing production. In particular, the present invention relates to an improved acid composition for treating wells.

In the acid treatment of calcareous formations for the purpose of increasing permeability and productivity of these formations, the acid is introduced through the well bore into the formation. As the acid moves outward from the well bore into the formation, acid-soluble matter of the earth contacted by the acid is attacked and dissolved away. This increases the effective size of the well bore and cleans out and enlarges the flow channels of the formation through which the oil or other material flows into the well bore. In many cases the production of treated wells is increased substantially. However, in many wells there is no increase in production and in some instances there is actually a decrease in the output of the wells after acid treatment.

The primary cause of the decrease in production caused by acid treatment of a well is the presence of silica and numerous silicates which are insoluble in the acid. The fluid remaining after the acid spends itself on the calcareous material in the formation causes siliceous materials such as the hydrous silicates to swell. With most siliceous materials negligible swelling takes place and a negligible amount is dispersed at pH values near zero. As an acid reacts with the calcareous material in the formation, however, its pH increases until ultimately the solution will approach a pH of about 7.0. As the pH of the acidic solution increases, it is accompanied by a continually increasing amount of swelled and dispersed siliceous materials. The swelling and dispersion normally is not too objectionable below pH values of about 2.5 or 3.0. Agents added to prevent the pH of the spent acid from rising above about 2.5 or 3.0 are called silicate-swelling control agents. In general, those agents which keep the pH at the lowest values are considered to be the best silicate swelling control agents. The swelled siliceous matter decreases the production of fluids from the formation by causing the blocking or plugging of the flow channels of the formation to the flow of the fluids contained within the formation.

It is an object of this invention to provide an improved composition of matter for acidizing formations. Another object of this invention is to provide an improved acid composition whereby the pH of the acid composition is maintained at a lower value for a longer period of time, thus allowing more time for acid treatment. It is still a further object of this invention to provide an improved acid composition for the acidizing of wells comprising an aqueous hydrochloric acid solution and a silicate swelling control agent. An additional object of this invention is to provide an acid composition for the acid treatment of calcareous formations whereby swelling of the insoluble, siliceous matter will be inhibited. A still further object of this invention is to provide an acidizing solution which tends to prevent plugging of the flow channels by the insoluble, siliceous matter liberated or dispersed by an acid which does not remain at a low pH after spending itself on the calcareous material present. Additional objects will become apparent from the description of this invention.

In the fulfillment of these objects, it has been found that the addition of aldehydes to an acid solution considerably reduces the pH value of the spent acid as compared to the pH of spent acid when no aldehydes have been added.

In carrying out the present invention a conventional acid is used in accordance with well known practices. The acid may be mixed with one or more of the following conventional well treating agents: silicate-swelling control agents, wetting agents, agents for the reduction of surface tension, agents to inhibit corrosion, penetrating agents, intensifying agents, etc.

The acid solution is pumped or otherwise introduced into the well bore and under a positive pressure forced into the surrounding formation. After the injection of the acid solution into the formation, the well is generally closed-in to allow time for the acid to attack the formation. As the acid attacks the calcareous material, the acid in the solution spends itself in reacting with this calcareous material. This results in an increase in the pH of the solution. At pH ranges of 4 to 5, an undesirable amount of swelling takes place in the insoluble silicates in the formation. These materials then block the flow channels in the formation through which the fluids contained within the formation flow into the well bore. The time allowed for shut-in or close-in of the well may range from only a few minutes to several hours, optimum results depending on the length of time required for the acid to react with the formation and on other characteristics of the formation. After the acid solution has spent itself in attacking the formation, it may be removed by pumping, bailing, or allowing the well to flow, if this is possible.

In order to illustrate the effect of the present invention, the swelling effect of an acid on the siliceous materials present in calcareous rock found in earth formations surrounding wells, is given in Table I. The information presented in Table I shows both the effect of pH on a siliceous material which was not hydrated and the effect of pH on the same material which was hydrated prior to pH adjustment. Concentrated hydrochloric acid was used to adjust the pH to the desired value. The siliceous material used was a Wyoming bentonite, which is known for its swelling and dispersing tendencies. The behavior exhibited by the nonhydrated material is believed to be more nearly representative of the process which takes place in most subterranean formations. The samples were thoroughly agitated to assure uniformity of the mixture of siliceous material and the hydrochloric acid solution. The samples were then centrifuged at approximately 2,000 times the acceleration of gravity for ½ hour and the coarse, fine, and total sedimentation volumes were recorded.

TABLE I

[Sedimentation volume after exposure to acid and centrifuging (based on 15 ml. sample of 6% by weight of bentonite dispersion)]

| pH of sample | Nonhydrated Bentonite | | | Prehydrated Bentonite | | |
|---|---|---|---|---|---|---|
| | Course | Fine | Total | Course | Fine | Total |
| 0.5 | 1.6 | 0.1 | 1.7 | 8.8 | 0.4 | 9.2 |
| 1.05 | 2.7 | 0.5 | 3.2 | 10.7 | 0.5 | 11.2 |
| 2.00 | 3.1 | 0.7 | 3.8 | 9.7 | 1.7 | 11.0 |
| 2.52 | | | | 9.1 | 2.1 | 11.5 |
| 2.95 | 3.2 | 0.7 | 3.9 | 9.5 | 3.3 | 12.8 |
| 4.10 | 4.7 | 1.2 | 5.9 | 8.8 | 6.2 | 15.0 |
| 5.00 | 6.1 | 1.8 | 7.7 | | | |
| 6.00 | 7.7 | 2.3 | 10.0 | | | |

These data represent and correlate with the swelling and consequent plugging of wells due to the presence of siliceous materials such as clays.

The following examples specifically illustrate the invention described herein. These examples are not, however, to be in any manner construed as limiting the objects, applications, or conditions of the invention herein set forth.

*Example I*

An acid solution was prepared comprising hydrochloric acid and water. This hydrochloric acid solution contained approximately 7.5 percent by weight concentration of hydrochloric acid. To this was added approximately 3 percent by weight acetaldehyde and 3 percent by weight of a surfactant, the surfactant being a polyoxyethylene thioether margeted as Sterox SK. To this acid solution was then added an amount greater than the stoichiometric equivalent of natural calcium carbonate rock such as that frequently found in the subterranean earth formations into which wells are drilled. The reaction was carried out under 100 p.s.i.g. pressure. The pH of the resulting spent acid was 1.3.

*Example II*

An acid solution was prepared comprising hydrochloric acid and water. This hydrochloric acid solution contained approximately 7.5 percent by weight concentration of hydrochloric acid. To this was added approximately 3 percent by weight formaldehyde and 3 percent by weight of a surfactant, the surfactant being a polyoxyethylene thioether marketed as Sterox SK. To this acid solution was added an amount greater than the stoichiometric equivalent of natural calcium carbonate rock such as that frequently found in subterranean earth formations into which wells have been drilled. The reaction was carried out under 100 p.s.i.g. pressure. The pH of the resulting spent acid was 0.9.

*Example III*

An acid solution was prepared comprising hydrochloric acid and water. This hydrochloric acid solution contained approximately 7.5 percent by weight concentration of hydrochloric acid. To this was added approximately 3 percent by weight of formaldehyde. To this solution was then added an amount greater than the stoichiometric equivalent of natural calcium carbonate rock such as that frequently found in subterranean earth formations into which wells have been drilled. The reaction was carried out under 100 p.s.i.g. pressure. The pH of the resulting spent acid was 1.3.

The efficacy of the invention is further illustrated by means of a well test wherein a hydrochloric acid solution is prepared as in Examples I through III with sufficient silicate swelling control agent so that the pH of the spent acid solution is maintained at the low levels comparable to Examples I through III. Thereafter the acid solution is injected through a well bore into a calcareous rock formation which contains siliceous materials.

To further illustrate the effectiveness of the invention herein described, Table II is given. This table presents acetaldehyde and formaldehyde in combination with a hydrochloric acid solution alone or containing various surfactants at 100 p.s.i.g. The information obtained in Table II was obtained as in Examples I and II. The amount of hydrochloric acid in the solution was 7.5 percent by weight in all cases. The amount of silicate-swell control agent and surfactant (if any) was 3 percent by weight. The pH represents the pH of the spent acid.

TABLE II

| Silicate-Swelling Control Agent | Surfactant | pH |
|---|---|---|
| Formaldehyde | Sterox Sk (polyoxyethylene thioether) | 0.9 |
| Do | None Added | 1.3 |
| Do | do | 1.5 |
| Acetaldehyde | Sterox SK | 1.5 |

The invention may be practiced at pressures below atmospheric pressure, atmospheric, or at elevated pressures up to and beyond 15,000 p.s.i.g. The effect of increased pressure on the utility of the silicate-swelling control agent is beneficial, although of small magnitude. For example, the pH values of spent 7.5 percent by weight hydrochloric acid solutions containing 3 percent by weight of formaldehyde and 3 percent by weight of a polyoxyethylene thioether were 1.8, 1.6, and 0.9 for pressures of atmospheric, 25 p.s.i.g., and 100 p.s.i.g., respectively.

The acid used in carrying out this invention may be commercial hydrochloric acid. However, any acid capable of attacking and dissolving the earth formation so as to form water-soluble salts therewith and increase its porosity may be employed. Non-limiting examples of such acids are nitric acid, acetic acid, hydrofluoric acid, fluosilicic acid, fluophosphoric acid and phosphoric acid. The amount of acid in the solution may vary widely and usually ranges from 2 to 25 percent by weight. Greater amounts of acid may be used. However, a more preferred range is about 7 to 15 percent by weight. The amount of other agents present in the acid solution will vary depending primarily upon the type of agent used. This, of course, may also vary according to the acid used. Frequently, the addition of a surfactant is desirable, and when used may range in concentration from 0.5 to 20 percent by weight. However, a more preferred range would be 1 to 5 percent by weight. There are a great number of surfactants available at present. A surfactant which is suitable when practicing this invention is a polyoxyethylene thioether. One of these polyoxyethylene thioether surfactants is marketed under the trade name of Sterox SK.

Though the aldehydes preferred in the practice of this invention are such lower molecular weight aldehydes as formaldehyde and acetaldehyde etc., such other aldehydes as propionaldehyde, and butyraldehyde can be used. More generally other aldehydes as those exemplified by the following non-limiting examples also can be added to well treating acids for use as silicate-swelling control agents. Non-limiting examples are isobutyraldehyde, acrolein, crotonaldehyde, salicyclic aldehyde, etc. Also anticipated in the invention herein disclosed are those compounds which by chemical reactions occurring within the oil reservoir form the aldehydes of this invention. Two non-limiting examples of such compounds are p-formaldehyde and haxamethylene tetramine.

The amount of silicate-swell control agent will vary somewhat with the conditions of the formation and with the acid used. Prasctically any amount may be anticipated in the practice of this invention. The lower limit may be as low as 0.5 weight percent or as high as 50 weight percent or more. A more practical operating range of silicate swell control agent concentration would be approximately 1 to 20 weight percent of the acid solution and a more preferred range would be 1 to 5 weight percent of the acid solution.

The method of adding the silicate swell control agent to the acid solution is not material other than that a method should be used which will cause a thorough mixing of acid solution and silicate swell control agent. The mixing may be done before introducing the acid solution into the well bore or the mixing may take place concurrent with introduction of the acid into the well bore.

What is claimed is:

1. In a method for acidizing a formation containing siliceous materials capable of swelling in the presence of a spent acid, the step which comprises injecting into the earth formation an aqueous acid solution capable of attacking and dissolving said earth formation having dispersed therein 0.5 to 50 weight percent of an aldehyde silicate-swelling control agent.

2. The method according to claim 1 wherein the aldehyde is a lower molecular weight aldehyde of 1 to 6 carbon atoms.

3. In a method for acidizing a calcareous formation containing siliceous materials capable of swelling in the presence of a spent acid, the step which comprises injecting into the formation an aqueous acid solution capable of attacking and dissolving said formation having dispersed therein 0.5 to 50 weight percent of a silicate swelling control agent which is a lower molecular weight aldehyde of 1 to 4 carbon atoms.

4. In a method for acidizing a calcareous formation containing siliceous materials capable of swelling in the presence of spent hydrochloric acid, the step which comprises injecting into the formation an aqueous hydrochloric acid solution having dispersed therein 0.5 to 50 weight percent of a silicate swelling control agent which is a lower molecular weight aldehyde of 1 to 4 carbon atoms.

5. The method according to claim 4 wherein the amount of hydrochloric acid present in the solution is 2 to 25 percent by weight.

6. The method according to claim 4 wherein the amount of hydrochloric acid present in the solution is about 7 to 15 percent by weight.

7. The method according to claim 4 wherein the amount of silicate-swelling control agent is from 1 to 20 percent by weight.

8. The method according to claim 4 wherein the amount of silicate-swelling control agent is from 1 to 5 percent by weight.

9. The method according to claim 4 in which the silicate-swelling control agent is formaldehyde.

10. The method according to claim 4 in which the silicate-swelling control agent is acetaldehyde.

11. The method according to claim 4 in which the silicate-swelling control agent is propionaldehyde.

12. The method according to claim 4 in which the silicate-swelling control agent is butyraldehyde.

13. The method according to claim 4 in which a surfactant is contained in the acid solution.

14. The method according to claim 4 wherein a surfactant is contained in the acid solution, said surfactant being a polyoxyethylene thioether.

15. The method according to claim 4 wherein a surfactant is contained in the acid solution in an amount of from 0.5 to 20 percent by weight.

References Cited in the file of this patent

UNITED STATES PATENTS

| | | |
|---|---|---|
| 2,124,530 | Loomis et al. | July 26, 1938 |
| 2,640,810 | Cardwell et al. | June 2, 1953 |

OTHER REFERENCES

Formaldehyde, by J. Frederic Walker, 2nd edition, published in 1953 by Reinhold Publishing Co., 330 West 42nd Street, New York 36, N.Y., pages 86 and 87 relied on.